US012573937B2

(12) United States Patent
Götz et al.

(10) Patent No.: US 12,573,937 B2
(45) Date of Patent: Mar. 10, 2026

(54) METHOD AND SYSTEM FOR MODIFYING CARRIER SIGNALS DURING PHASE-SHIFTED PULSE WIDTH MODULATION

(71) Applicant: Dr. Ing. h.c. F. Porsche Aktiengesellschaft, Stuttgart (DE)

(72) Inventors: Stefan Götz, Forstern (DE); Tomas Kacetl, Kaiserslautern (DE); Jan Kacetl, Kaiserslautern (DE); Nima Tashakor, Kaiserslautern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 369 days.

(21) Appl. No.: 17/860,191

(22) Filed: Jul. 8, 2022

(65) Prior Publication Data

US 2023/0318432 A1     Oct. 5, 2023

(30) Foreign Application Priority Data

Mar. 30, 2022     (DE) ..................... 10 2022 107 483.8

(51) Int. Cl.
    H02M 1/00          (2007.01)
(52) U.S. Cl.
    CPC ....... H02M 1/0043 (2021.05); H02M 1/0067 (2021.05)
(58) Field of Classification Search
    CPC ............. H02M 1/0003; H02M 1/0016; H02M 1/0019; H02M 1/0025; H02M 1/0043;
    (Continued)

(56) References Cited

U.S. PATENT DOCUMENTS 7,425,806 B2 *  9/2008  Schnetzka ........... H02M 5/4585
                                                                318/41
8,907,604 B2   12/2014  Miller et al.
            (Continued)

FOREIGN PATENT DOCUMENTS

DE      102013201538 A1    8/2013
EP        3694099 A1       8/2020

OTHER PUBLICATIONS

S. Kouro et al., "Multicarrier PWM with DC-Link Ripple Feedforward Compensation for Multilevel Inverters", IEEE, Jan. 2008, pp. 52-59. (Year: 2008).*

(Continued)

*Primary Examiner* — Thienvu V Tran
*Assistant Examiner* — Carlos O Rivera-Perez
(74) *Attorney, Agent, or Firm* — Buchanan Ingersoll & Rooney PC

(57)          ABSTRACT

A method for controlling a modular multi-level converter including a multiplicity of modules having at least one energy storage unit and a plurality of controllable switches. The modular multi-level converter is controlled by pulse-width-modulated control signals. A respective control signal is generated on the basis of a respective carrier signal having a phase shift relative to the respective module, and on the basis of at least one reference signal. As a result of a comparison, based on a size comparison, of a signal profile of the respective carrier signal with the at least one reference signal, a connection time of the at least one energy storage unit of the respective module to a load current is triggered. The signal profile of the respective carrier signal is modified by at least one change within three degrees of freedom.

13 Claims, 10 Drawing Sheets

(58) Field of Classification Search
CPC .. H02M 1/0067; H02M 1/007; H02M 1/0074;
H02M 1/0077; H02M 1/008; H02M
1/0085; H02M 1/009; H02M 1/0095;
H02M 1/0081; H02M 1/44; H02M 1/088;
H02M 7/42; H02M 7/44; H02M 7/483;
H02M 7/4833; H02M 7/4835; H02M
7/4837; H02M 7/487; H02M 7/49; H02M
7/53; H02M 7/537; H02M 7/5387; H02M
7/53878; H02M 7/539; H02M 7/5395;
H02M 7/527; H02P 27/06; H02P 27/08;
H02P 27/085; H02P 27/14; H02P 27/16
USPC ... 363/15–17, 34, 35–37, 40–43, 65, 67–72,
363/123, 131, 132; 323/212–219, 266,
323/271–275, 280, 282–285, 288, 351
See application file for complete search history.

(56) References Cited

U.S. PATENT DOCUMENTS

| | | | | |
|---|---|---|---|---|
| 9,374,000 | B1 * | 6/2016 | Belloni | .................. H02M 3/156 |
| 2012/0326507 | A1 | 12/2012 | Usami et al. | |
| 2014/0036557 | A1 * | 2/2014 | Nondahl | .................. H02M 1/12 |
| | | | | 363/71 |
| 2018/0006576 | A1 * | 1/2018 | Jung | ....................... H02M 7/49 |

OTHER PUBLICATIONS

Tekwani et al., "Analysis of carrier offset technique used in a five-level inverter scheme with emphasis on DC-link capacitor voltage balancing", 2017 Nirma University International Conference on Engineering (NUiCONE), 2017, Conference Paper, IEEE, 10 pages.

Tashakor et al., "Modular Multilevel Converter with Sensorless Diode-Clamped Balancing through Level-Adjusted Phase-Shifted Modulation", IEEE Transactions on Power Electronics, Institute of Electrical and Electronics Engineers, Jul. 2021, vol. 36(7), pp. 7725-7735, XP011843125.

Kouro et al., "Multicarrier PWM with DC-Link Ripple Feedforward for Multilevel Inverters", 12th International Power Electronics and Motion Control Conference, IEEE, Aug. 1, 2006, pp. 234-239, XP031008920.

Sinopoli et al., "Introducing the Elliptical Carrier for PWM Converters: Derivation and Properties for Phase-Shift Compensation", Energy Conversion Congress and Exposition (ECCE), 2011 IEEE, Sep. 17, 2011, pp. 3714-3719, XP032067665.

Ghias et al., "On Reducing Power Losses in Stack Multicell Converters with Optimal Voltage Balancing Method", IEEE Transactions on Power Electronics, Sep. 1, 2015, pp. 4682-4695, vol. 30(9), XP011578608.

* cited by examiner

METHOD AND SYSTEM FOR MODIFYING CARRIER SIGNALS DURING PHASE-SHIFTED PULSE WIDTH MODULATION

CROSS-REFERENCE TO RELATED APPLICATION

This application claims priority to German Patent Application No. 10 2022 107 483.8, filed Mar. 20, 2022, the content of such application being incorporated by reference herein in its entirety.

FIELD OF THE INVENTION

The present invention relates to a method for phase-shifted pulse width modulation of a carrier signal for controlling modules of a modular multi-level converter. Furthermore, a corresponding control device and a modular multi-level converter comprising this control is device are described.

BACKGROUND OF THE INVENTION

Modular or cascaded converters are of greatly increasing importance for both AC and DC systems. In contrast to traditional power electronics using a small number of power switches to switch over an input or output voltage between a small number of levels in order on average to obtain a desired clamping voltage, modular multi-level converters, in particular the so-called traditional MMC and the MMSPC, enable a voltage output in very fine steps. This is made possible by a dynamically changeable electrical configuration of energy storage units, such as e.g. capacitors or batteries, arranged in modules, with electrical or electronic switches situated in the modules. In this case, the modules assume specific module switching states comprising e.g. serial or parallel interconnection of their energy storage units with those of other modules. Optionally, a bypass of a respective energy storage unit is also possible.

One simple possibility for controlling modules of the converter is afforded by phase-shifted modulation of carrier signals, referred to as "phase-shifted carrier (PSC) modulation". A distinction is drawn between conventional PSC modulation and unconventional PSC modulation. Conventional PSC modulation presupposes ideal and completely identical modules, i.e. each module does not have a resistance element and exhibits identical voltage and charge. By contrast, unconventional PSC modulation requires a considerable computational complexity or disregards dynamic operation of the system outright.

DE 10 2013 201 538 A1, which is incorporated by reference herein, describes a method for controlling a converter by means of pulse-width modulated control signals. The carrier signal periods are adapted on the basis of a pseudo-random period pattern.

U.S. 2012/0326507 A1, which is incorporated by reference herein, discloses a power conversion apparatus comprising a plurality of converters or inverters and a plurality of microprocessors for controlling the converters. The microprocessors compare phase voltages of the converters with triangular-waveform carrier signals.

EP 3 694 099 A1, which is incorporated by reference herein, discusses a method for controlling parallel inverters of an electrical grid, wherein a carrier signal frequency is adapted. A data processor is configured to determine an observed phase difference between a reference phase point and an observed position sample of a pulse width modulation carrier signal of the inverters.

SUMMARY OF THE INVENTION

Phase-shifted and at the same time overlapping, but otherwise identical, carrier signals constitute one of the modulation methods used for the most part for generating and controlling switching pulses for all types of modular, offset or cascaded converters. Although uniformly phase-shifted carrier signals with individually set reference signals guarantee a uniform distribution of discharging or charging over all modules, particularly if the carrier signals are embodied with a sawtooth or triangular shape, they exhibit disadvantages for control of charge balancing between modules. Moreover, different internal resistances in the case of a changing load resulting in different output voltages cannot be corrected.

Against this background, described herein is a method for controlling modules of a modular multi-level converter which, by means of suitable modulation of phase-shifted carrier signals, enables active charge balancing between individual modules with regard to their state of charge and a flowing current respectively requested by a load. Different parasitic impedances of the modules or a total impedance of the converter are/is also intended to be able to be taken into account. Furthermore, the intention is to provide a system on which the method is implementable.

A method for controlling a modular multi-level converter is proposed, wherein the modular multi-level converter comprises a multiplicity of modules having at least one energy storage unit and a plurality of controllable switches. The modular multi-level converter is controlled by means of pulse-width-modulated control signals, wherein a respective control signal is generated on the basis of a respective carrier signal having a phase shift relative to the respective module, and on the basis of at least one reference signal. As a result of a comparison—based on a size comparison—of a signal profile of the respective carrier signal with the at least one reference signal, a connection time of the at least one energy storage unit of the respective module to a load current is triggered. The signal profile of the respective carrier signal is modified by at least one change within the following three degrees of freedom, namely by the respective carrier signal being shifted vertically relative to the at least one reference signal and/or signal edges of the respective carrier signal being curved convexly and/or signal edges of the respective carrier signal being curved concavely.

The coining of the term "convex" curvature means that a convexly curved signal edge, by comparison with its uncurved initial shape, assumes a temporal profile in which connecting sections of two points on the convexly curved signal edge always lie below the temporal profile of the convexly curved signal edge. In this sense the convexly curved signal edge is curved "outward" relative to an (integral) area formed between its uncurved initial shape and the time axis, i.e. the integral area is increased.

The coining of the term "concave" curvature means that a concavely curved signal edge, by comparison with its uncurved initial shape, assumes a temporal profile in which connecting sections of two points on the concavely curved signal edge always lie above the temporal profile of the concavely curved signal edge. In this sense the concavely curved signal edge is curved "inward" relative to an (integral) area formed between its uncurved initial shape and the time axis, i.e. the integral area is decreased.

The starting point for the following considerations is phase-shifted and at the same time overlapping, but otherwise identical, carrier signals. If a number of N modules e.g. interconnected in series are arranged as an individual phase section of the multi-level converter, then the carrier signal of the i-th module has a respective phase shift of 2*Pi*(i−1)/N. Furthermore, the at least one reference signal corresponds to a modulation reference signal initially provided for all the modules.

The extension according to aspects of the invention of degrees of freedom during the phase-shifted modulation of carrier signals with vertical shifts between carrier signal and reference signal, and/or convex or concave curvatures in signal edges of respective carrier signals, is advantageously used in embodiments of the method according to aspects of the invention described below in order to balance charge and temperature among the modules or cascaded converters;

to compensate for a negative effect of a system-internal resistance;

to balance various parameters of electronic components in the modules;

to generate a plurality of output variables by multi-frequency modulation;

to scale carrier signal amplitudes for charge and temperature balancing of modules.

In this case, the respective aims are achieved within a slight effect or with no effect on a quality of the output voltage of the multi-level converter.

Hereinafter, without restricting the generality, it shall be agreed that the at least one energy storage unit of the respective module contributes to the load current, i.e. is charged or discharged, if a signal profile of the respective carrier signal assigned to the respective module progresses below the reference signal assigned to the same module. Accordingly, the at least one energy storage unit of the respective module is disconnected from the load current, i.e. it is not charged or discharged, if a signal profile of the respective carrier signal assigned to the respective module progresses above the reference signal assigned to the same module. This defines a load interval corresponding to the connection time of the at least one energy storage unit of the respective module to the load current in a phase section embodied as a series connection of modules during a full period duration of the respective carrier signal.

The at least one energy storage unit is formed e.g. by a capacitor, a battery or a fuel cell. The control of the multi-level converter is used to provide output variables, such as voltage or current, requested by a central controller. By virtue of the modifications of the respective carrier signal according to aspects of the invention, the control actively controls charging or discharging of the energy storage units of all modules and also controls respective charge balancing between the energy storage units.

In one advantageous embodiment of the method according to aspects of the invention, the respective carrier signal is formed with a sawtooth profile or with a triangular shape. The procedure generally involves forming the pulse width modulation with phase-shifted carrier signals particularly advantageously with a sawtooth profile in order, in the case of uniform distribution of the phase-shifted carrier signals, to ensure the same load interval, i.e. an identical discharging time or charging time of the energy storage units in all the modules. It is also conceivable e.g. to generate carrier signals with a sinusoidal shape, without thereby restricting the advantageous possibilities for modification of the carrier signals by means of the method according to aspects of the invention or the embodiments of the method according to aspects of the invention described below.

In one embodiment of the method according to aspects of the invention, a respective zero position of at least one carrier signal is shifted vertically upward by a respective zero position shift value $\delta_i^+$, wherein at the same time a respective zero position of at least one further carrier signal is shifted vertically downward by a respective zero position shift value $\delta_j^-$. In this case, the respective zero position shift values are chosen in such a way that a sum over all zero position shift values yields a value of zero. It goes without saying that this embodiment relates only to the respective carrier signals, while the respective reference signals remain unchanged in this case. In the case of a shift of a respective carrier signal upward/downward, the respective load interval is effectively reduced/increased, in particular in comparison with all other modules. In order to achieve the zero sum, e.g. a different number of carrier signals can also be shifted upward and/or respectively downward. In this regard, e.g. a first carrier signal can be shifted upward by a zero position shift value $\delta_1^+$, and a second carrier signal and a third carrier signal can respectively be shifted downward by further zero position shift values $\delta_2^-$ and $\delta_3^-$ as long as according to aspects of the invention a sum of $\delta_2^-$ and $\delta_3^-$ corresponds to the zero position shift value $\delta_1^+$ in terms of magnitude. Generally, it should thus be taken into consideration that for all i-th modules whose respective carrier signal is shifted vertically upward by a respective zero position shift value $\delta_i^+$, and for all j-th modules whose respective carrier signal is shifted downward by a respective zero position shift value $\delta_j^-$, it holds true that:

$$\Sigma_i \delta_i^+ + \Sigma_j \delta_j^- = 0 \qquad (1)$$

Complying with equ. 1 ensures that an output voltage of the multi-level converter that is established at a phase section end remains unchanged. This embodiment of the method according to aspects of the invention thus advantageously enables a different load distribution among the respective modules, such that e.g. modules having energy storage units discharged to a comparatively greater extent can be protected (positive zero position shift value), and modules having energy storage units discharged to a comparatively lesser extent can be subjected to higher loading (negative zero position shift value).

In a further embodiment of the method according to aspects of the invention, at least one reference signal is assigned to a respective i-th module and is shifted vertically upward by a respective reference signal shift value $\vartheta_i^+$ relative to the modulation reference signal. At the same time at least one further reference signal is assigned to a further j-th module and is shifted vertically downward by a respective reference signal shift value $\vartheta_j^-$ relative to the modulation reference signal. In this case, the respective reference signal shift values are chosen in such a way that a sum over all reference signal shift values yields a value of zero. It goes without saying that this further embodiment relates only to the respective reference signals, while the respective carrier signals remain unchanged in this case. In the case of a shift of the respective reference signal upward/downward, the load interval for the respective module in a phase section embodied as a serial connection of modules is effectively increased/reduced, in particular in comparison with all other modules. In order to achieve the zero sum, e.g. a different number of respective reference signals can also be shifted upward and/or respectively downward. Generally it should be taken into consideration that for all i-th modules whose respective reference signal is shifted vertically upward by a respective reference signal shift value $\vartheta_i^+$, and for all j-th modules whose respective reference signal is shifted vertically downward by a respective reference signal shift value $\vartheta_j^-$, it holds true that:

$$\Sigma\vartheta_i^+ + \Sigma\vartheta_j^- = 0 \tag{2}$$

Complying with equ. 2 ensures that an output voltage of the multi-level converter that is established at the phase section end remains unchanged. This further embodiment of the method according to aspects of the invention thus advantageously enables a different load distribution among the respective modules, such that e.g. modules having energy storage units discharged to a comparatively greater extent can be protected (negative reference signal shift value, i.e. shift of the respective reference signal downward), and modules having energy storage units discharged to a comparatively lesser extent can be subjected to higher loading (positive reference signal shift value, i.e. shift of the respective reference signal upward).

In yet another embodiment of the method according to aspects of the invention, signal edges of at least one carrier signal are deformed on the basis of the load current, wherein optionally a respective signal edge is curved convexly or outward (away from a time axis), i.e. values of the respective signal edge are increased in comparison with the undeformed signal edge. As a result, a current contribution of a respective module controlled by the at least one carrier signal is decreased. A respective signal edge is optionally curved concavely or inward (toward a time axis), i.e. values of the respective signal edge are decreased in comparison with the undeformed signal edge. As a result, a current contribution of a respective module controlled by the at least one carrier signal is increased. The respective convex or concave curvature is chosen according to the load current.

If the modulation reference signal is increased by a specific value, then a voltage rise turns out to be comparatively small in the case of high load currents. By contrast, if the modulation reference signal is increased by the same specific value in the case of low load currents, then load variations are much larger. This is principally due to parasitic impedances within the circuit that are caused either by switches or other electronic components in the system of the converter. The further embodiment of the method according to aspects of the invention for providing signal edges of respective carrier signals with respective curvatures therefore advantageously eliminates the amplified or attenuated voltage drop depending on the occurrence of such parasitic impedances. The respective convex or concave curvatures counteract or compensate for the above-described effects depending on the load current respectively flowing by virtue of the fact that as a result of suitably convex or concave shaping of the respective signal edges, a formation of the respective load interval can be provided with a load current dependence that is similar but acts oppositely to the parasitic impedances. The concave curvature, i.e. the curvature extending inward or toward the time axis, is helpful here in order to increase the load current, or to compensate for an effect that reduces the load current, whereas the convex curvature, i.e. the curvature directed outward or away from the time axis, is helpful here in order to decrease the load current, or to compensate for an effect that amplifies the load current.

In a still further refined embodiment of the method according to aspects of the invention, signal edges of at least one carrier signal assigned to the respective i-th module are curved convexly or outward by a respective curvature value $\beta_i$. At the same time signal edges of at least one further carrier signal assigned to the respective j-th module are curved concavely or inward by a magnitude of a respective negative curvature value $\beta_j$. In this case, the respective curvature values are chosen in such a way that a sum over all curvature values yields a value of zero:

$$\Sigma\beta_k = 0 \tag{3}$$

As a result, a distribution of impedance values of the modules around an average value is advantageously compensated for. Such a convex or concave curvature can advantageously be effected independently of or in addition to the curvature according to aspects of the invention of the still further embodiment described above, which relates to the compensation of a load current dependence.

In another embodiment of the method according to aspects of the invention, additionally at least one carrier signal is superposed with at least one further carrier signal, such that multi-frequency carrier signals are formed. The carrier signals superposed with one another advantageously have different frequencies. By choosing suitable cut-off frequencies, it is possible to differentiate a voltage resulting from each multi-frequency carrier signal.

In a further refined embodiment of the method according to aspects of the invention, a respective amplitude of at least one carrier signal assigned to the respective i-th module is scaled by a respective scaling value $\lambda_i$. At the same time a respective amplitude of at least one further carrier signal assigned to the respective j-th module is scaled by a respective further scaling value $\lambda_j$. The respective scaling values are chosen in such a way that a sum over all inverse scaling values is kept constant:

$$\sum_{k=1}^{K} \frac{1}{\lambda_i} = const. \tag{4}$$

Given K scaled amplitudes, a value of the constant of const=K results proceeding from carrier signals formed originally e.g. with the unit value 1 as amplitude. In this case, an increase/decrease of the respective amplitude results in a shortening/lengthening of the load interval of the respective module. Complying with equ. 4 ensures that a low-frequency portion of the output voltage established at the phase section end remains unchanged.

Furthermore, a control device for a modular multi-level converter is described, wherein the modular multi-level converter comprises a multiplicity of modules having at least one energy storage unit and a plurality of controllable switches. The control device is configured to control the modular multi-level converter by means of pulse-width-modulated control signals, to generate a respective control signal on the basis of a respective carrier signal having a phase shift relative to the respective module, and on the basis of at least one reference signal, as a result of a comparison—based on a size comparison—of a signal profile of the respective carrier signal with the at least one reference signal, to trigger a connection time of the at least one energy storage unit of the respective module to a load current and to modify the signal profile of the respective carrier signal by at least one change within the following three degrees of freedom, namely by the respective carrier signal being shifted vertically relative to the at least one reference signal and/or signal edges of the respective carrier signal being curved convexly and/or signal edges of the respective carrier signal being curved concavely, and wherein in particular the control device is further configured to implement a method according to aspects of the invention.

The control device according to aspects of the invention is advantageously able to compensate for parasitic portions in the electrical circuit of the modular multi-level converter and to compensate for inequalities or imbalances between modules while taking account of a respective system state of the modular multi-level converter.

Furthermore, a modular multi-level converter is described which comprises a control device according to aspects of the invention and on which a method according to aspects of the invention is implementable.

BRIEF DESCRIPTION OF THE DRAWINGS

Further advantages and configurations of the invention are evident from the description and the accompanying drawing.

It goes without saying that the features mentioned above and those yet to be explained below can be used not only in the combination respectively specified, but also in other combinations or by themselves, without departing from the scope of the present invention.

The figures are described in an interrelated and all-embracing manner; identical components are assigned the same reference signs.

Figure 1A:
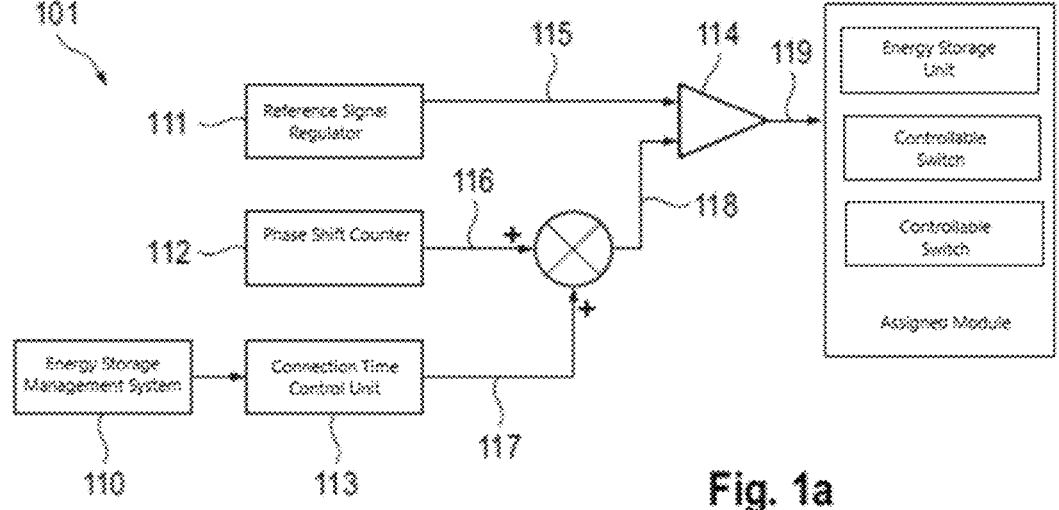

FIG. 1a schematically shows a circuit concerning zero position shifts of carrier signals in one embodiment of the method according to aspects of the invention.

Figure 1B:
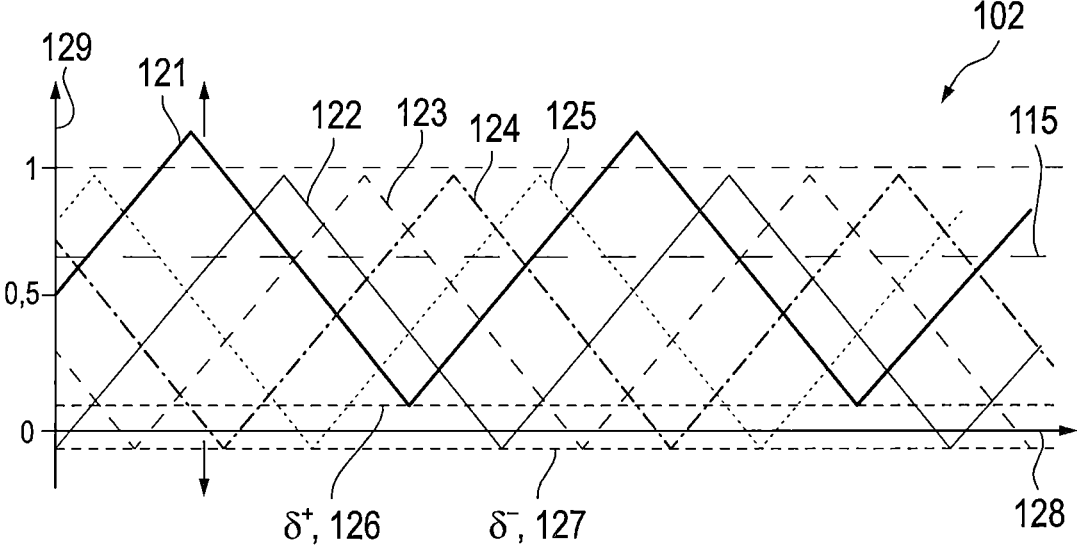
Figure 1B:
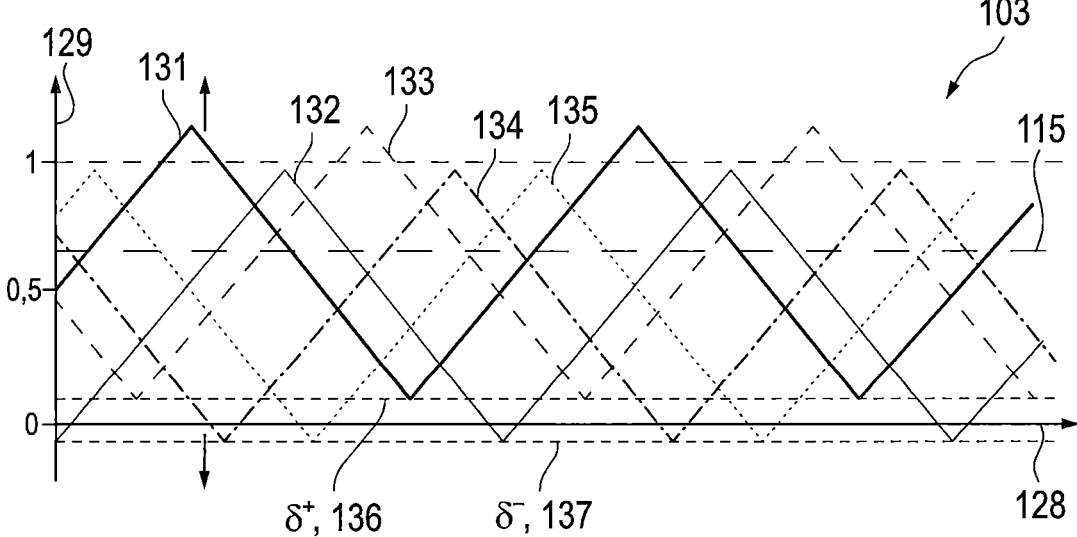

FIG. 1b graphically shows signal profiles of carrier signals in the case of zero position shifts in the embodiment of the method according to aspects of the invention.

Figure 1C:
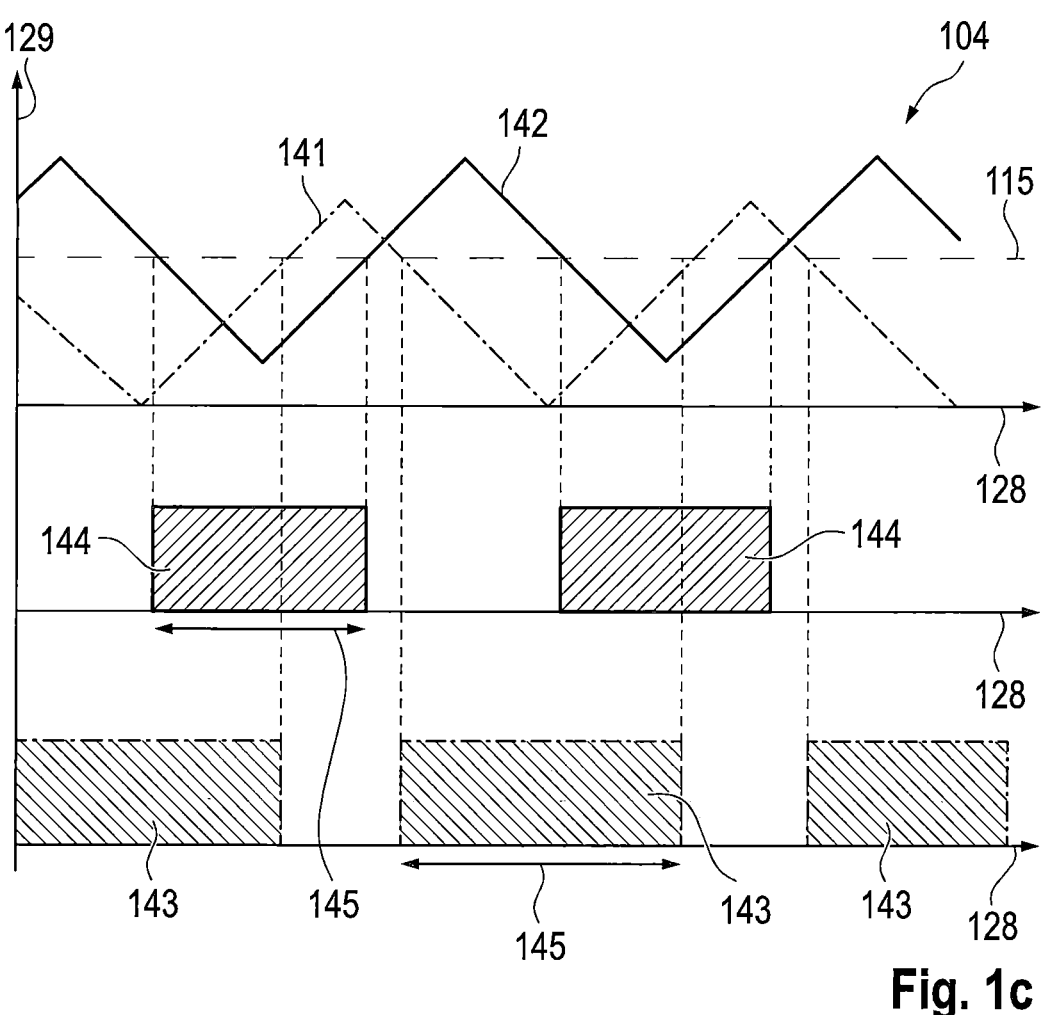

FIG. 1c graphically shows a signal profile of carrier signals with connection times in the embodiment of the method according to aspects of the invention.

Figure 1D:
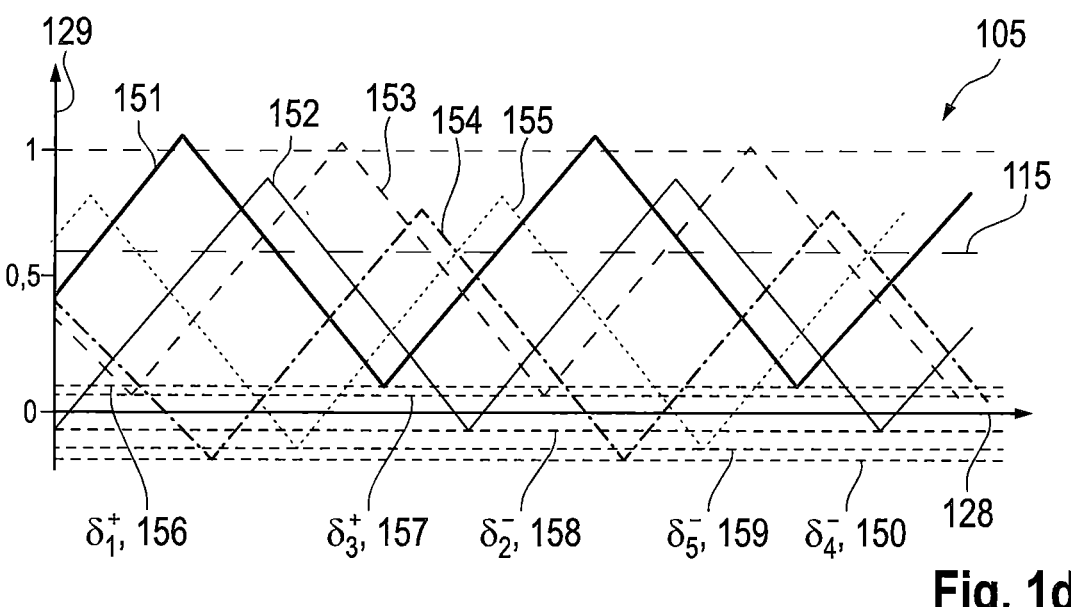

FIG. 1d graphically shows a signal profile of a plurality of carrier signals in the case of zero position shifts in the embodiment of the method according to aspects of the invention.

Figure 2A:
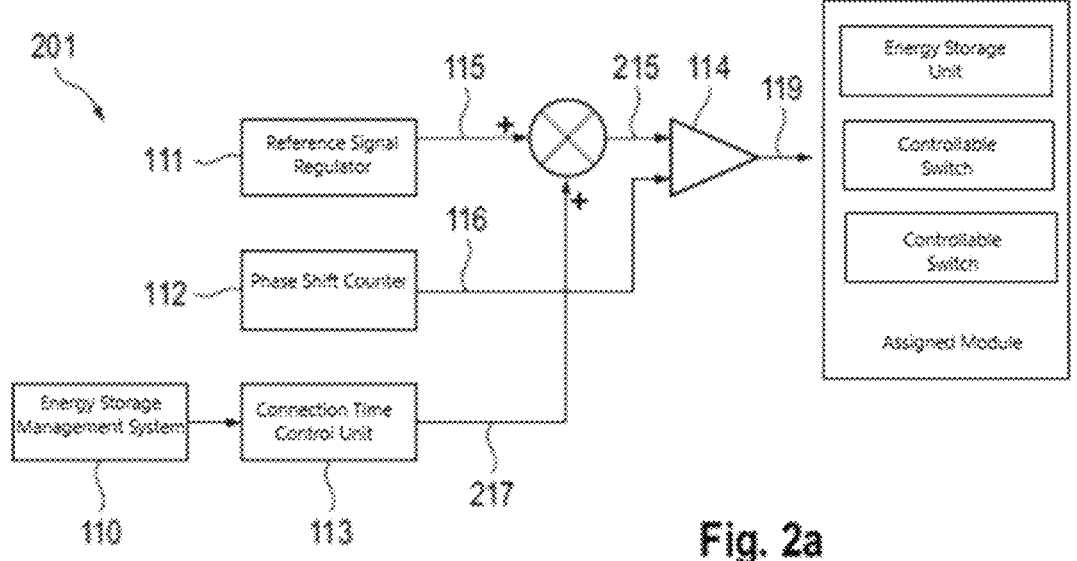

FIG. 2a schematically shows a circuit concerning a reference signal shift in a further embodiment of the method according to aspects of the invention.

Figure 2B:
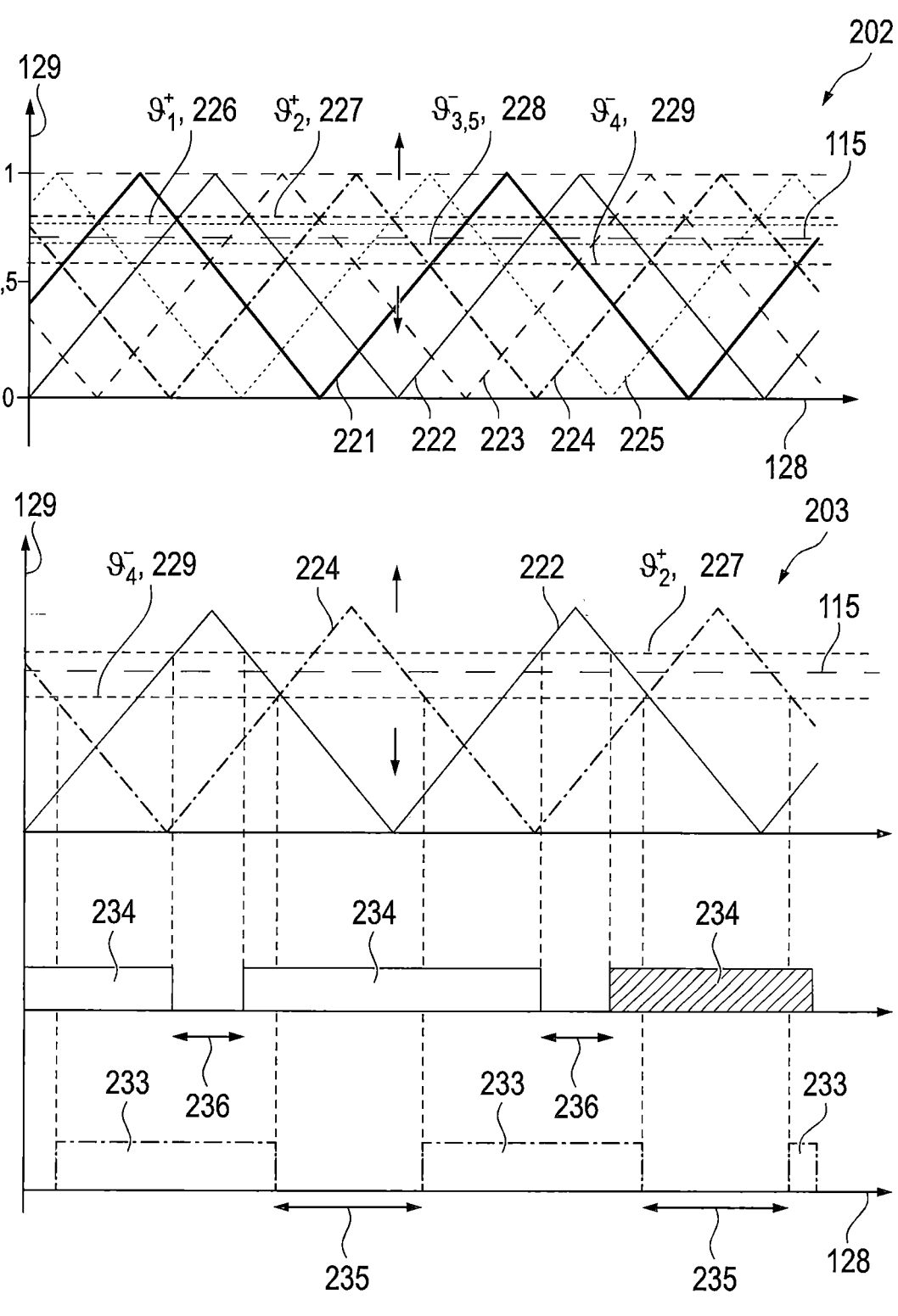

FIG. 2b graphically shows signal profiles of carrier signals with reference signal shifts and connection times in the further embodiment of the method according to aspects of the invention.

Figure 3:
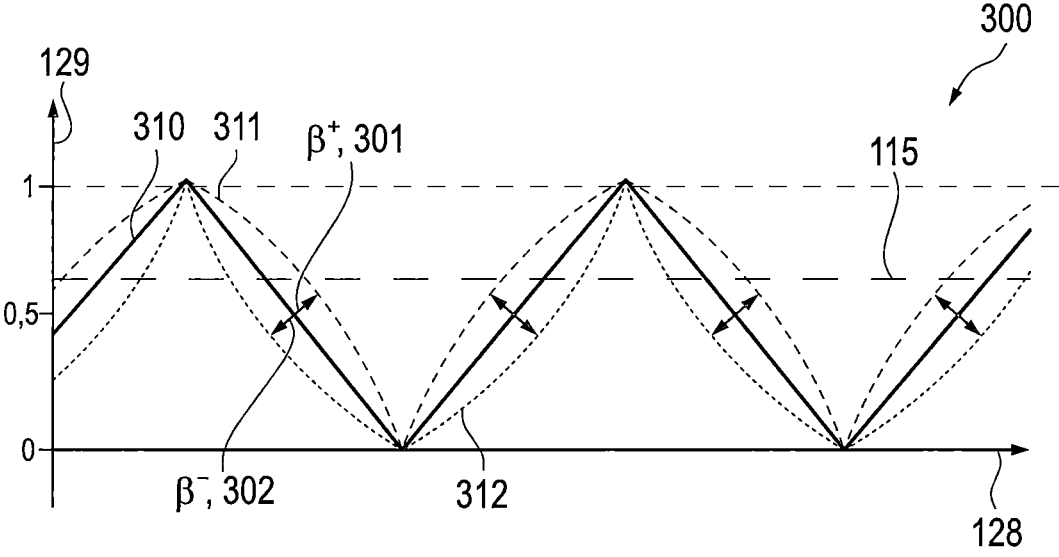

FIG. 3 graphically shows signal profiles of carrier signals with respective curvatures in a still further embodiment of the method according to aspects of the invention.

Figure 4A:
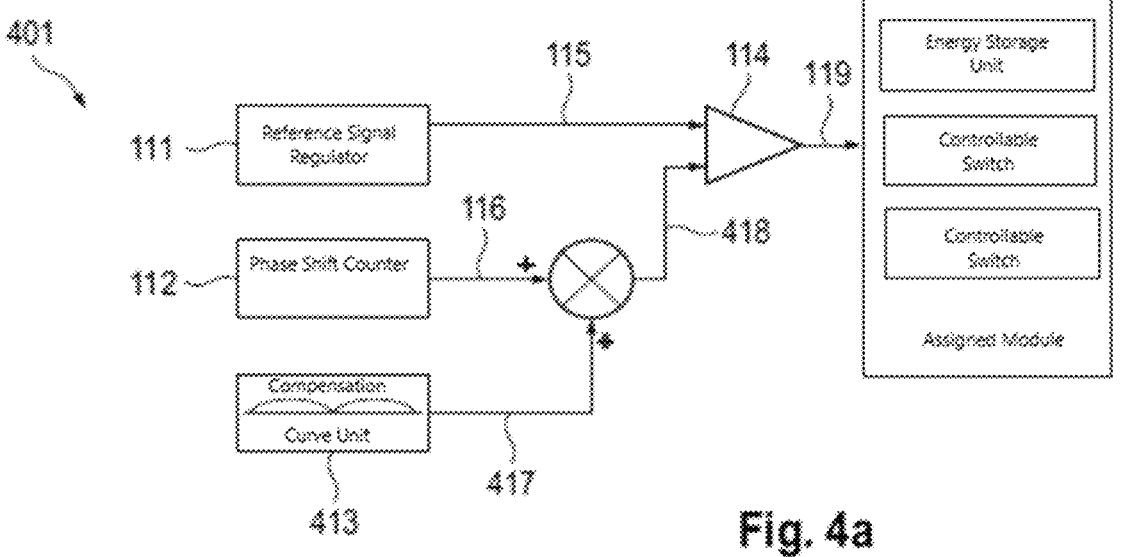

FIG. 4a schematically shows a circuit concerning a curvature of carrier signals in a still further refined embodiment of the method according to aspects of the invention.

Figure 4B:
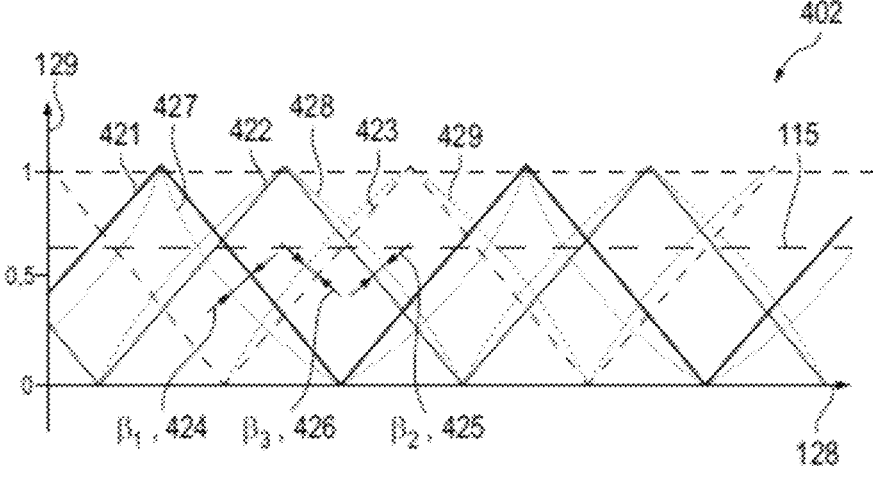

FIG. 4b graphically shows signal profiles of carrier signals with curvatures in the still further refined embodiment of the method according to aspects of the invention.

Figure 5A:
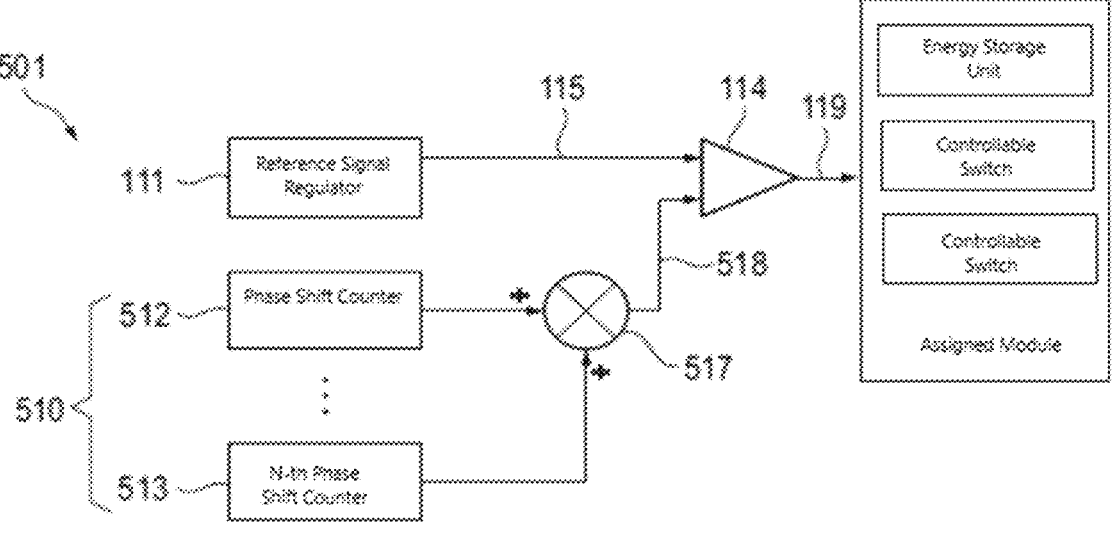

FIG. 5a schematically shows a circuit concerning multi-frequency carrier signals in another embodiment of the method according to aspects of the invention.

Figure 5B:
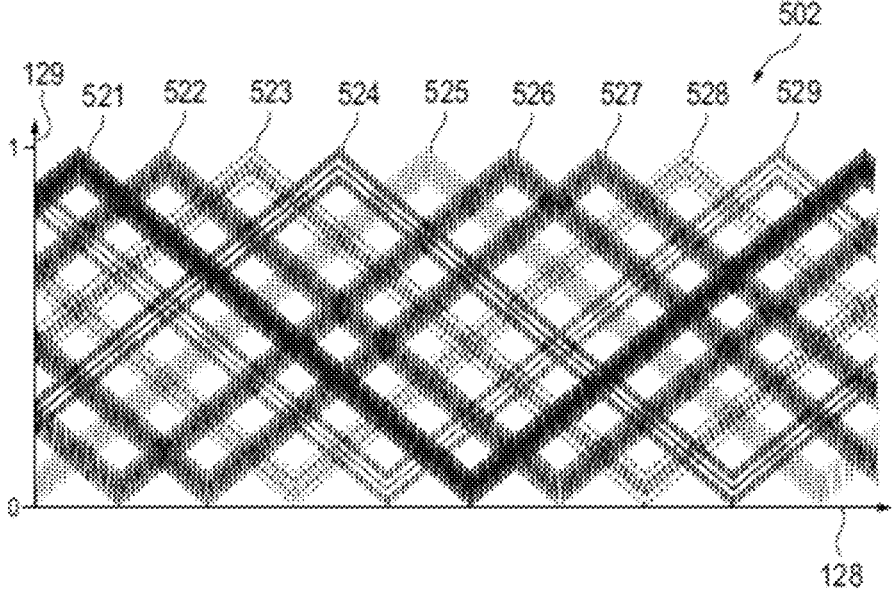

FIG. 5b graphically shows a signal profile of multi-frequency carrier signals in the other embodiment of the method according to aspects of the invention.

Figure 6A:
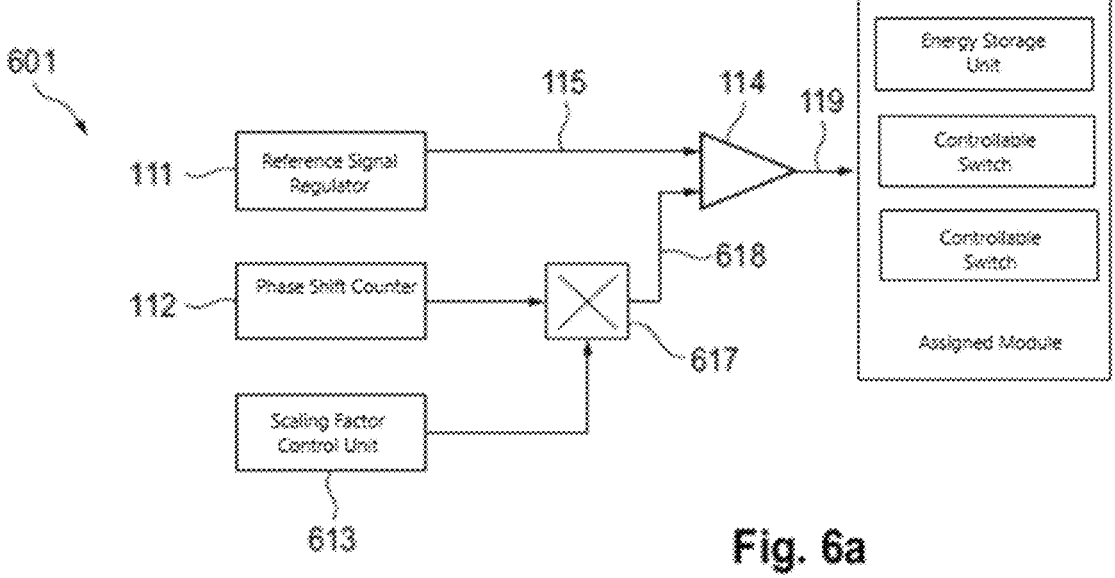

FIG. 6a schematically shows a circuit concerning amplitude scaling in a further refined embodiment of the method according to aspects of the invention.

Figure 6B:
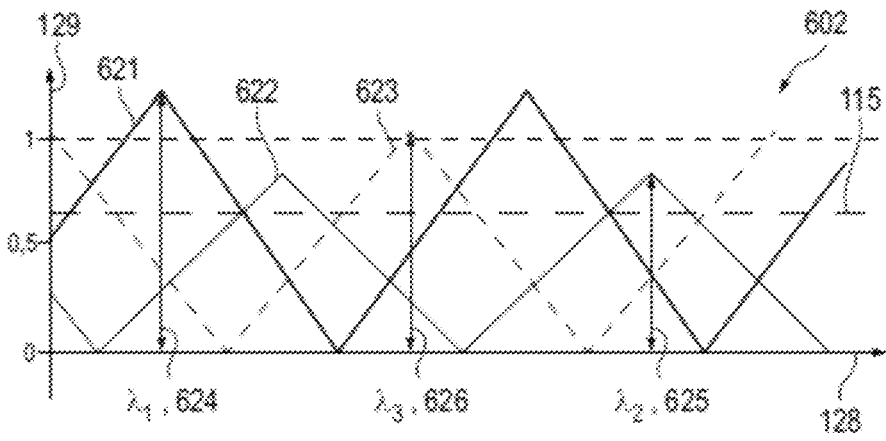

FIG. 6b graphically shows signal profiles for amplitude scaling in the further refined embodiment of the method according to aspects of the invention.

Figure 7:
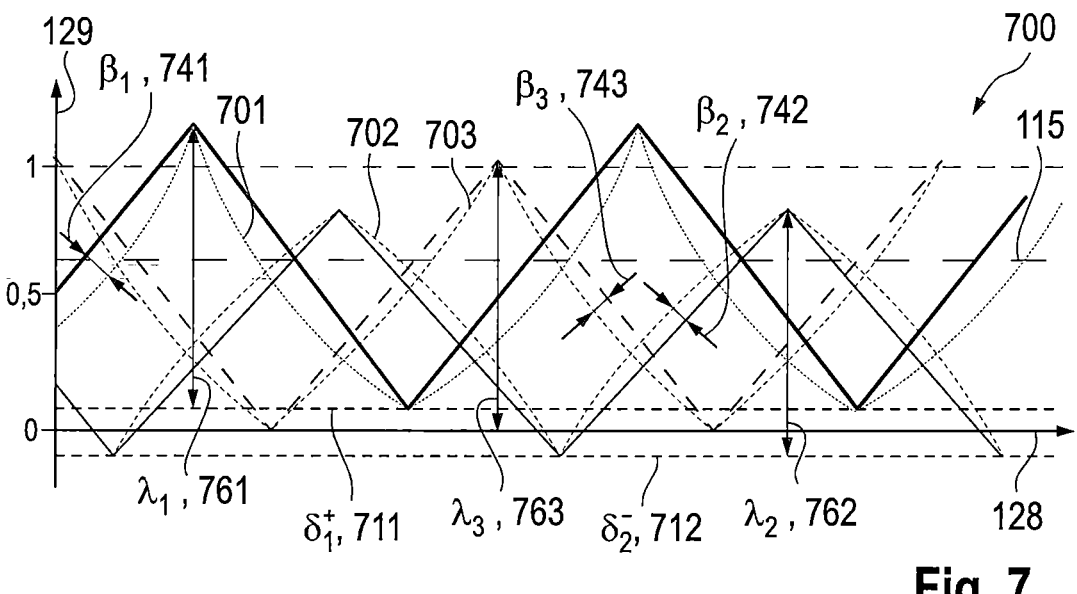

FIG. 7 graphically shows signal profiles of carrier signals with various modification possibilities in an even further refined embodiment of the method according to aspects of the invention.

DETAILED DESCRIPTION OF THE INVENTION

FIG. 1a schematically shows a circuit 101 concerning zero position shifts of carrier signals in one embodiment of the method according to aspects of the invention. An energy storage management system 110 provides a connection time control unit 113 with information concerning a state of charge of energy storage elements of respective modules, on the basis of which the connection time control unit 113 performs respective zero position shifts 117 of the carrier signals assigned to the respective modules. A phase shift counter 112 provides multiple carrier signals 116, each of which is phase-shifted and is provided with the respective zero position shift 117 by way of a mixer and passes as a modified carrier signal 118 to a comparator 114. At the same time a reference signal regulator 111 provides a single reference signal 115, which likewise passes to the comparator 114. The comparator 114 compares the modulation reference signal 115 with the respective modified carrier signals 118 and provides the respectively assigned modules with multiple switching signals 119, thus e.g. provides the respectively assigned module with a switch-on pulse in the event of the reference signal 115 being undershot by the respective modified carrier signal 118, and provides the respectively assigned module with a switch-off pulse in the event of the reference signal 115 being exceeded by the respective modified carrier signal 118. This embodiment of the method according to aspects of the invention thus advantageously makes it possible to balance different states of charge among the respective modules by virtue of modules having energy storage units discharged to a comparatively greater extent being protected (positive zero position shift value) and modules having energy storage units discharged to a comparatively lesser extent being subjected to higher loading (negative zero position shift value).

FIG. 1b graphically shows signal profiles 102 and 103 of carrier signals 121, 122, 123, 124, 125, 131, 132, 133, 134, 135 that are identical, but phase-shifted by respectively 72° angular degrees, in the case of zero position shifts 126, 127, 136, 137 in the embodiment of the method according to aspects of the invention. The respective carrier signals 121, 122, 123, 124, 125, 131, 132, 133, 134, 135 are plotted in their time profile along a time axis 128, wherein for the present consideration all the carrier signals 121, 122, 123, 124, 125, 131, 132, 133, 134, 135 shall be normalized in terms of their amplitude to a value one of a signal axis 129. In a first step, in the signal profile 102 a first carrier signal 121 is shifted vertically upward by a positive zero position shift value $\delta^+$ 126. Since the reference signal 115 remains unchanged, a shorter connection time to a load current flowing in a phase section of modules results for the assigned module or the at least one energy storage unit thereof. In order to compensate for this, the zero position of the further carrier signals 122, 123, 124, 125 is shifted vertically downward by a negative zero position shift value $\delta^-$ 127. In order to satisfy equ. 1, $\delta^+ + 4*\delta^- = 0$ must hold true, i.e. the zero position of the first carrier signal 121 is shifted vertically upward by a value quadrupled, while the further carrier signals 122, 123, 124, 125 are each shifted vertically downward by said value itself. In order that the at least one energy storage unit of a further module, e.g. the one to which the third carrier signal 133 is assigned, is protected during discharging operation, for example, the zero position of said carrier signal 133 is additionally shifted upward by a positive zero position shift value $\delta^+$ 136. In order to leave the load current undisturbed by that, it becomes apparent for the negative zero position shift value $\delta^-$ 137 from equ. 1 that $\delta^-=-2*\delta^+/3$ must hold true for this case.

FIG. 1*c* graphically shows a signal profile 104 of carrier signals 141, 142 with resulting connection times 143, 144 in the embodiment of the method according to aspects of the invention. The carrier signal 141 is assigned to an i-th module, wherein the connection time 143 of the at least one energy storage unit having a time duration $T_i$145 results from undershooting of the carrier signal 141 in comparison with the reference signal 115. The carrier signal 142 is assigned to a j-th module, wherein the connection time 144 having a time duration $T_j$146 follows from undershooting of the reference signal 115 by the carrier signal 142. The zero position of the carrier signal 142 is released, thus resulting in a shorter connection time 144 for the j-th module in comparison with the connection time 143 of the i-th module.

FIG. 1*d* graphically shows a signal profile 105 of a plurality of carrier signals 151, 152, 153, 154, 155 with respective zero position shifts 156, 157, 158, 159, 150 in the embodiment of the method according to aspects of the invention. Depending on the state of charge of the at least one energy storage unit in the k-th module, k=1 to 5, a respective zero position shift value $\delta_1^+$ 156, $\delta_2^-$ 158, $\delta_3^+$ 157, $\delta_4^-$ 150, $\delta_5^-$ 159 is assigned to the carrier signal 151, 152, 153, 154, 155. For the example shown in FIG. 1*d*, according to equ. 1 it must hold true that $\delta_1^+ + \delta_2^- + \delta_3^+ + \delta_4^- + \delta_5^- = 0$ in order that the load current of the phase section is left unchanged vis-á-vis a signal profile without zero position shifts.

FIG. 2*a* schematically shows a circuit 201 concerning a reference signal shift in a further embodiment of the method according to aspects of the invention. The energy storage management system 110 provides the connection time control unit 113 with information concerning a state of charge of energy storage elements of respective modules, on the basis of which the connection time control unit 113 performs respective reference signal shifts 217 of the carrier signals assigned to the respective modules. A phase shift counter 112 provides multiple carrier signals 116, each of which is phase-shifted, said carrier signals passing to a comparator 114. At the same time a reference signal regulator 111 provides a single reference signal 115, which is provided with the respective reference signal shift 217 by way of a mixer and likewise passes to the comparator 114 as a modified reference signal 215. The comparator 114 compares the respectively modified reference signals 215 with the respectively phase-shifted carrier signals 116, and provides the respectively assigned modules with multiple switching signals 119, thus e.g. provides the respectively assigned module with a switch-on pulse in the event of the modified reference signal 215 being undershot by the respective carrier signal 116, and provides the respectively assigned module with a switch-off pulse in the event of the modified reference signal 215 being exceeded by the respective carrier signal 116.

FIG. 2*b* graphically shows signal profiles 202 and 203 of carrier signals 221, 222, 223, 224, 225 with shifted reference signals 226, 227, 228, 229 and connection times 233, 234 in the further embodiment of the method according to aspects of the invention. The respective carrier signals 221, 222, 223, 224, 225 are plotted in their time profile along the time axis 128, wherein for the present consideration all the carrier signals 221, 222, 223, 224, 225 shall be normalized in terms of their amplitude to a value one of a signal axis 129. In the signal profile 202, a first modified reference signal 226 is shifted vertically upward by a positive reference signal shift value $\vartheta_1^+$ 226 relative to the reference signal 115. In relation to the original reference signal 115, a longer connection time to a load current flowing in a phase section of modules accordingly results for the first carrier signal 221 or for the at least one energy storage unit of the assigned first module. A second modified reference signal 227 shall also be shifted vertically upward by a positive reference signal shift value $\vartheta_2^+$ 227, and a longer connection time accordingly results here, too, for the assigned second module in comparison with that connection time which would result with the original reference signal 115. In order to compensate for this, the modified reference signals 228 and 229 are shifted vertically downward by a respective negative reference signal shift value $\vartheta_{3.5}^-$ and $\vartheta_4^-$ relative to the reference signal 115. The connection times of the respectively assigned modules that result from the third, fourth and fifth carrier signals 223, 224, 225 are correspondingly shortened. In order that the load current of the phase section is left unchanged vis-á-vis a signal profile without reference signal shifts, according to equ. 2 it must hold true that $\vartheta_1^+ + \vartheta_2^+ + 2*\vartheta_{3.5}^- + \vartheta_4^- = 0$ is satisfied.

The effect of the respective shift $\vartheta_2^+$, $\vartheta_4^-$ of two reference signals 227, 229, examined in more specific detail by way of example in the signal profile 202, on the respectively resulting connection time 233, 234 is illustrated in the signal profile 203. The carrier signal 222 is assigned to the second module, wherein the connection time 234 of the at least one energy storage unit of the second module having a time duration $T_2$ 236 results from undershooting of the carrier signal 222 in comparison with the reference signal 227 shifted by the reference signal shift value $\vartheta_2^+$ relative to the reference signal 115. The carrier signal 224 is assigned to the fourth module, wherein the connection time 233 of the at least one energy storage unit of the fourth module having a time duration $T_4$ 235 results from undershooting of the carrier signal 224 in comparison with the reference signal 229 shifted by the reference signal shift value $\vartheta_4^-$ relative to the reference signal 115.

FIG. 3 graphically shows signal profiles 300 of carrier signals 311, 312 with respective curvatures $\beta^+$ 301 and $\beta^-$ 302 in a still further embodiment of the method according to aspects of the invention. A respective signal edge of the carrier signal 311 is curved convexly or outward (away from the time axis 128) by a curvature value $\beta^+$ 301 relative to the signal edge of the undeformed carrier signal 310, i.e. values of the respective signal edge are increased in comparison with the signal edge of the undeformed carrier signal 310. Since the reference signal 115 remains unchanged, the time duration of the connection time is thus shortened and the current contribution of a respective module controlled by such a carrier signal 311 is decreased. A respective signal edge of the carrier signal 312 is curved concavely or inward (toward the time axis 128) by a magnitude of a negative curvature value $\beta^-$ 302 relative to the signal edge of the undeformed carrier signal 310, i.e. values of the respective signal edge are decreased in comparison with the signal edge of the undeformed carrier signal 310. Since the reference signal 115 remains unchanged, the time duration of the connection time thus increases and the current contribution of a respective module controlled by such a carrier signal 312 is increased. Therefore, this still further embodiment has effects on a modulation index or the load current effectively flowing through the phase section of modules and can advantageously be used to compensate for voltage-decreasing effects dependent on the requested load current in the case of high loads, or parasitic impedances.

FIG. 4a schematically shows a circuit 401 concerning a curvature of carrier signals in a still further refined embodiment of the method according to aspects of the invention. Depending on the load current flowing, a compensation curve unit 413 generates respective curvature values 417, with which respective phase-shifted carrier signals 116 provided by the phase shift counter 112 are modified by way of a mixer to form a respective curved carrier signal 418 and pass to a comparator 114. At the same time a reference signal regulator 111 provides a single reference signal 115, which likewise passes to the comparator 114. The comparator 114 compares the modulation reference signal 115 with the respective curved carrier signal 418, and provides the respectively assigned modules with multiple switching signals 119, e.g. provides the respectively assigned module with a switch-on pulse in the event of the reference signal 115 being undershot by the respective curved carrier signal 418, and provides the respectively assigned module with a switch-off pulse in the event of the reference signal 115 being exceeded by the respective curved carrier signal 418.

FIG. 4b graphically shows signal profiles 402 of curved carrier signals 427, 428, 429 with respective curvature values $\beta_1$ 424, $\beta_2$ 425, $\beta_3$ 426 formed relative to undeformed carrier signals 421, 422, 423 in the still further refined embodiment of the method according to aspects of the invention. Such curved carrier signals 427, 428, 429 are advantageously used in order to compensate for a distribution of impedance values of the modules around an average value. Such curvatures can be imposed on the shapings described in FIG. 3, although equ. 3 must be complied with here in order that the load current of the phase section is not additionally influenced. For the example shown in FIG. 4b, it is thus apparent that the magnitude of the curvature value $\beta_1$ 424 directed inward must correspond to the sum of the two curvature values $\beta_2$ 425 and $\beta_3$ 426 directed outward.

FIG. 5a schematically shows a circuit 501 concerning multi-frequency carrier signals 518 in another embodiment of the method according to aspects of the invention. A number of N phase shift counters 510 provide respectively phase-shifted carrier signals. A carrier signal originating from a first phase shift counter 512 is modified by way of a mixer 517 respectively with further carrier signals generated by up to an N-th phase shift counter 513 to form a respective multi-frequency carrier signal 518. In this case, at least the carrier signal originating from the phase shift counter 512 has a different frequency than the further carrier signals. The further carrier signals are formed e.g. with that frequency by way of which the phase shift is also formed.

FIG. 5b graphically shows signal profiles 502 of multi-frequency carrier signals 521, 522, 523, 524, 525, 526, 527, 528, 529 in the other embodiment of the method according to aspects of the invention. In the case of the total of nine multi-frequency carrier signals 521, 522, 523, 524, 525, 526, 527, 528, 529, a carrier signal originating from the phase shift counter 512 from FIG. 5a, at comparatively higher frequency, was modulated on nine phase-shifted carrier signals.

FIG. 6a schematically shows a circuit 601 concerning amplitude scaling in a further refined embodiment of the method according to aspects of the invention. A scaling factor control unit 613 provides a respective scaling factor on the basis of the state of charge of energy storage elements of respective modules, which scaling factor is multiplied, by a multiplier 617, by respective carrier signals of a phase shift counter 116 that are assigned to the respective modules. Amplitude-scaled carrier signals 618 emerging therefrom pass to the comparator 114. At the same time a reference signal regulator 111 provides a single reference signal 115, which likewise passes to the comparator 114. The comparator 114 compares the modulation reference signal 115 with the respective amplitude-scaled carrier signal 618, and provides the respectively assigned modules with multiple switching signals 119.

FIG. 6b graphically shows signal profiles 602 concerning amplitude scaling of three carrier signals 621, 622, 623 in the further refined embodiment of the method according to aspects of the invention. Depending on the state of charge of the at least one energy storage unit in the m-th module, m=1 to 3, a respective scaling value $\lambda_1$ 624, $\lambda_2$ 625, $\lambda_3$ 626 is assigned to the carrier signal 621, 622, 623. A respective carrier signal provided with a scaling factor of greater than one results in a shorter connection time of the respectively assigned module, while a respective carrier signal provided with a scaling factor of less than one results in a longer connection time of the respectively assigned module. For the example shown in FIG. 6b, according to equ. 4 it must hold true that $1/\lambda_1+1/\lambda_2+1/\lambda_3$=const is satisfied in order that the load current of the phase section is left unchanged vis-á-vis a signal profile without amplitude scaling.

FIG. 7 graphically shows signal profiles 700 of carrier signals 701, 702, 703 with various modification possibilities in an even further refined embodiment of the method according to aspects of the invention. All possibilities for modification of carrier signals superposed in a phase-shifted manner in the embodiments demonstrated above or FIGs. described above can optionally be configured in any desired combination. In this regard, the carrier signal 701 is provided with a concave curvature with curvature value $\beta_1$ 741, an amplitude scaling with scaling value $\lambda_1$ 761 and also a zero position shift with zero position shift value $\vartheta_1^+$ 711. The carrier signal 702 is provided with a convex curvature with curvature value $\beta_2$ 742, an amplitude scaling with scaling value $\lambda_2$ 762 and a zero position shift with zero position shift value $\vartheta_2^-$ 712. Finally, the carrier signal 703 is provided with a concave curvature with curvature value $\beta_3$ 743, an amplitude scaling with scaling value $\lambda_3$ 763 and no zero position shift.

LIST OF REFERENCE SIGNS

101 Circuit concerning zero position shift
102 Signal profile with one raised carrier signal
103 Signal profile with two raised carrier signals
104 Signal profile with switching times
105 Signal profile with a plurality of zero position shifts
110 Energy storage management system
111 Reference signal regulator
112 Phase shift counter for carrier signal
113 Connection time control unit
114 Comparator
115 Reference signal
116 Multiple carrier signals
117 Zero position shift
118 Modified carrier signals
119 Multiple switching pulses
121 First carrier signal
122 Second carrier signal
123 Third carrier signal 124 Fourth carrier signal
125 Fifth carrier signal
126 Positive vertical shift by $\delta^+$
127 Negative vertical shift by $\delta^-$
128 Time axis
129 Signal axis
131 First carrier signal
132 Second carrier signal
133 Third carrier signal
134 Fourth carrier signal
135 Fifth carrier signal
136 Positive vertical shift by $\delta^+$
137 Negative vertical shift by $\delta^-$
141 Carrier signal of the i-th module
142 Carrier signal of the j-th module
143 Connection time of the i-th module
144 Connection time of the j-th module
145 Time duration $T_i$
146 Time duration $T_j$
150 Negative vertical shift by $\delta_4^-$
151 First carrier signal
152 Second carrier signal
153 Third carrier signal
154 Fourth carrier signal
155 Fifth carrier signal
156 Positive vertical shift by $\delta_1^+$
157 Positive vertical shift by $\delta_3^+$
158 Negative vertical shift by $\delta_2^-$
159 Negative vertical shift by $\delta_5^-$
201 Circuit concerning reference signal shift
202 Signal profile concerning reference signal shift
203 Signal profile with switching times
215 Modified reference signal
217 Multiple reference signal adaptations
221 First carrier signal
222 Second carrier signal
223 Third carrier signal
224 Fourth carrier signal
225 Fifth carrier signal
226 First reference signal shifted vertically upward by $\vartheta_1^+$
227 Second reference signal shifted vertically upward by $\vartheta_2^+$
228 Third reference signal shifted vertically downward by $\vartheta_{3.5}^-$
229 Fourth reference signal shifted vertically downward by $\vartheta_4^-$
233 Switching times of the fourth module
234 Switching times of the second module
235 Time duration $T_4$
236 Time duration $T_2$
300 Signal profile concerning signal edge curvature
301 Curvature outward with value $\beta^{30}$
302 Curvature inward with value $\beta^-$
310 Undeformed carrier signal
311 Convex carrier signal
312 Concave carrier signal
401 Circuit concerning signal edge curvature
402 Signal profiles with signal edge curvature
413 Generation of curvature values
417 Carrier signal curvatures
418 Curved carrier signals
421 First carrier signal
422 Second carrier signal
423 Third carrier signal
424 Curvature inward with curvature value $\beta_1$
425 Curvature outward with curvature value $\beta_2$
426 Curvature outward with curvature value $\beta_3$ 427 First carrier signal with concave signal edges
428 Second carrier signal with convex signal edges
429 Third carrier signal with convex signal edges
501 Circuit concerning multi-frequency carrier signals
502 Signal profile with multi-frequency carrier signals
510 Generation of carrier signals
512 First carrier signal
513 N-th carrier signal
517 Mixer of carrier signals
518 Combined carrier signals
521 First multi-frequency carrier signal
522 Second multi-frequency carrier signal
523 Third multi-frequency carrier signal
524 Fourth multi-frequency carrier signal
525 Fifth multi-frequency carrier signal
526 Sixth multi-frequency carrier signal
527 Seventh multi-frequency carrier signal
528 Eighth multi-frequency carrier signal
529 Ninth multi-frequency carrier signal
601 Circuit concerning amplitude scaling
602 Signal profile with amplitude scaling
613 Scaling factor
617 Multiplication of scaling factor by carrier signal
618 Modified carrier signals
621 First carrier signal
622 Second carrier signal
623 Third carrier signal
624 Scaling factor $\lambda_1$
625 Scaling factor $\lambda_2$
626 Scaling factor $\lambda_3$
700 Signal profile with modified carrier signals
701 First carrier signal
702 Second carrier signal
703 Third carrier signal
711 Positive vertical shift by $\delta_1^{30}$
712 Negative vertical shift by $\delta_2^-$
741 Curvature inward with curvature value $\beta_1$
742 Curvature outward with curvature value $\beta_2$
743 Curvature inward with curvature value $\beta_3$
761 Scaling factor $\lambda_1$
762 Scaling factor $\lambda_2$
763 Scaling factor $\lambda_3$

What is claimed is:

1. A method for controlling a modular multi-level converter including a multiplicity of modules each having at least one energy storage unit and a plurality of controllable switches, said method comprising: controlling the modular multi-level converter by means of pulse-width-modulated control signals, generating a respective control signal on a basis of a respective carrier signal having a phase shift relative to the respective module, and on the basis of at least one reference signal, comparing a signal profile of the respective carrier signal with the at least one reference signal, triggering a connection time of the at least one energy storage unit of the respective module to a load current, balancing states of charge among the multiplicity of modules by shifting the signal profile of the respective carrier signal vertically upward by a multiple of a zero position shift value and shifting the signal profile of other carrier signals vertically upward or downward by the zero position shift value, wherein a sum of the zero position shifts of the respective carrier signal and the other carrier signals results in the load current having a signal profile that is unshifted, and assigning the connection time of the respective carrier signal to a respective one of the multiplicity of modules, wherein the connection time has a time duration based on a total duration of undershooting of the at least one reference signal by the respective carrier signal.

2. The method as claimed in claim 1, further comprising forming the respective carrier signal with a sawtooth profile.

3. The method as claimed in claim 1, further comprising shifting a respective zero position of at least one carrier signal vertically upward by a respective zero position shift value, wherein at the same time a respective zero position of at least one further carrier signal is shifted vertically downward by a respective zero position shift value, and choosing the respective zero position shift values in such a way that a sum over all zero position shift values yields a value of zero.

4. The method as claimed in claim 3, wherein the respective zero position of the at least one carrier signal is shifted vertically upward by a respective zero position shift value that is multiplied by a factor of four.

5. The method as claimed in claim 3, further comprising shifting a respective zero position of at least one additional carrier signal associated with the at least one energy storage unit vertically upward by a respective positive zero position shift value.

6. The method as claimed in claim 1, wherein the respective carrier signal is phase-shifted by 72 angular degrees.

7. The method as claimed in claim 1, further comprising releasing a respective zero position of the at least one carrier signal to establish a shorter connection time as compared to a connection time of at least one additional carrier signal to another respective one of the multiplicity of modules.

8. A control device for a modular multi-level converter, wherein the modular multi-level converter comprises a multiplicity of modules each having at least one energy storage unit and a plurality of controllable switches, wherein the control device is configured to control the modular multi-level converter by pulse-width-modulated control signals for generating a respective control signal on the basis of a respective carrier signal having a phase shift relative to the respective module, and on the basis of at least one reference signal, wherein as a result of a comparison between a signal profile of the respective carrier signal with the at least one reference signal, the control device is configured to trigger a connection time of the at least one energy storage unit of the respective module to a load current and to balance states of charge among the multiplicity of modules by shifting the signal profile of the respective carrier signal by vertically upward by a multiple of a zero position shift value and shifting the signal profile of other carrier signals vertically upward or downward by the zero position shift value, wherein a sum of the zero position shifts of the respective carrier signal and the other carrier signals results in the load current having a signal profile that is unshifted, and wherein the control device is configured to assign the connection time of at least one carrier signal to a respective on of the multiplicity of modules, and the connection time as a time duration that is activated based on a total duration of undershooting of the at least one reference signal by the at least one carrier signal.

9. A modular multi-level converter which comprises the control device as claimed in claim 8.

10. The control device as claimed in claim 8, wherein the control device is further configured to shift a respective zero position of at least one carrier signal vertically upward by a respective zero position shift value, and at the same time shift a respective zero position of at least one further carrier signal vertically downward by a respective zero position shift value, and choose the respective zero position shift values in such a way that a sum over all zero position shift values yields a value of zero.

11. The control device as claimed in claim 10, wherein the respective zero position of the at least one carrier signal is shifted vertically upward by a respective zero position shift value that is multiplied by a factor of four.

12. The control device as claimed in claim 10, wherein the control device is further configured to shift a respective zero position of at least one additional carrier signal associated with the at least one energy storage unit vertically upward by a respective positive zero position shift value.

13. The control device as claimed in claim 8, wherein the control device is further configured to release a respective zero position of the at least one carrier signal to establish a shorter connection time as compared to a connection time of at least one additional carrier signal to another respective one of the multiplicity of modules.

*     *     *     *     *